United States Patent [19]

Blum et al.

[11] Patent Number: 5,192,804

[45] Date of Patent: Mar. 9, 1993

[54] CARNITINE-SUPPLEMENTED DIET FOR STARTER PIGS

[75] Inventors: Stephen A. Blum, Des Moines, Iowa; Robert D. Goodband; Jim L. Nelssen, both of Manhattan, Kans.; G. Larry Newton, Tifton, Ga.

[73] Assignees: Lonza Inc., Fair Lawn, N.J.; Kansas State University Research Foundation, Manhattan, Kans.; University of Georgia Research, Athens, Ga.

[21] Appl. No.: 905,149

[22] Filed: Jun. 22, 1992

Related U.S. Application Data

[63] Continuation of Ser. No. 673,986, Mar. 22, 1991, abandoned.

[51] Int. Cl.$^5$ .................. A61K 35/78; A01N 37/30; A23K 1/18
[52] U.S. Cl. ............................ 514/554; 426/807; 424/442; 424/548; 514/773; 514/909
[58] Field of Search ............... 514/554, 556, 773, 909; 426/807; 424/442, 548

[56] References Cited

U.S. PATENT DOCUMENTS

| | | | |
|---|---|---|---|
| 3,810,994 | 5/1974 | Witgand | 424/316 |
| 4,254,147 | 3/1981 | Cavazza | 514/556 |
| 4,434,160 | 2/1984 | Jeretin et al. | 514/23 |
| 4,656,191 | 4/1987 | Fanelli | 514/556 |
| 4,689,226 | 8/1987 | Nurmi et al. | 424/93 C |
| 4,702,914 | 10/1987 | Ryan | 424/195.1 |
| 4,883,672 | 11/1989 | Shug et al. | 426/2 |

FOREIGN PATENT DOCUMENTS 04231 2/1991 PCT Int'l Appl. .

OTHER PUBLICATIONS

J. A. Hansen et al., "Evaluation of Plasma Proteins and Meat Extract . . . ," abstract.
J. L. Nelssen, "High Nurient-Density Diets for Weanling Pigs," *Kansas State U. Swine Res. Report* 1986, pp. 35-50.
W. H. Turlington et al., "Effects of Protein and Carbohydrate Source . . . ," *J. Anim. Sci.*, 1989, 67:2333-2340.
D. C. Mahan et al., "Effect of Pig Weaning Weight and Associated Nursery . . . ," *J. Anim. Sci.*, 1991, 69:1370-1378.
T. D. Etherton et al., "Stimulation of Pig Growth Performance . . . ," *J. Anim. Sci.*, 1987, 64:433-442.
1987 University of Georgia Swine Report, pub #44 pp. 45-49.

*Primary Examiner*—Ronald W. Griffin
*Assistant Examiner*—Ralph Gitomer
*Attorney, Agent, or Firm*—Kilpatrick & Cody, Darby & Darby

[57] ABSTRACT

A feed composition containing L-carnitine and a high nutrient density diet is found to increase the lean-to-fat ratio of early weaned pigs. The L-carnitine is preferably reduced as the animal passes through its various stages of development, with initial concentrations ranging from 5 to 5000 ppm. In the finishing stage, less than 5 ppm of L-carnitine may advantageously be incorporated in the diet.

12 Claims, No Drawings

CARNITINE-SUPPLEMENTED DIET FOR STARTER PIGS

This is a continuation of copending application Ser. No. 07/673,986 filed on Mar. 22, 1991, now abandoned

BACKGROUND OF THE INVENTION

It has long been desirable to increase feed efficiency, weight gain, and lean tissue of swine. Work has been performed with carnitine to achieve certain of these results and some success has been achieved. G. L. Newton and K.D. Haydon reported in the 1986 *University of Georgia Swine Report* that feeding diets containing 0.95, 1.1 or 1.25% lysine, with or without 0.2% dl-carnitine HCl, to 28 day old nursery pigs had an effect on daily weight gains and feed efficiency. The pigs were fed a conventional diet containing 72.4% corn and 24.2% soybean meal with vitamin, mineral and antibiotic supplementation. The 1.1% lysine diet produced higher daily gains and improved feed efficiencies than the other diets. The effect on daily gain was significant throughout the study, while the effect on feed efficiency was significant for the first 4 days. There were also significant linear and curvilinear effects of lysine level on feed efficiency after 4 and 28 days. Carnitine did not have a significant effect on performance and did not alter the need for lysine. However, the results indicated the possibility of a greater response to supplemental lysine when nursery diets were also supplemented with carnitine. There were indications that post-weaning lag might be somewhat reduced in lighter weight pigs.

The results of two supplemental trials conducted to determine whether addition of carnitine to nursery diets would have an effect on post-weaning lag were reported in the 1987 *University of Georgia Swine Report* by G. L. Newton and K.D. Haydon. In the first trial, 144 pigs were fed simple corn-soy diets containing two levels of lysine and four levels of carnitine. For the other trial, 180 pigs 28 days of age were fed complex diets containing milk products and three levels of lysine and three levels of carnitine. When added to the simple diet, carnitine tended to produce an increase in feed intake during the first 4 days, which resulted in slightly better gains and feed efficiency at that time. When added to the complex diet, carnitine tended to increase food intake over the entire 20 day trial. Carnitine addition resulted in increased weight gains at 14 and 20 days.

Work with L-carnitine in connection with finishing pigs has also been conducted. U.S. Pat. Application, Ser. No 387,856, filed July 31, 1989, improved weight gain, feed efficiency, and reduction of back fat were observed.

In addition, efforts have been made to decrease post-weaning "lag" which has become more of a problem as swine are weaned earlier and earlier. Research work has been directed towards a variety of nutritional programs for early weaned pigs (weaning from 14 to 21 days of age), including high nutrient-density diets (J.L. Nelssen, "High Nutrient-Density Diets for Weanling Pigs," Kansas State University Swine Research Report is that the feed regimes described did not appear to increase the lean tissue growth.

It has been reported that swine from different genetic sources (genotypes) have different capacities for lean tissue growth and that its disposition is affected by the availability of amino acids. In a 1989 *University of Kentucky Research Report* in an article by T.S. Stahly et al., "Influence of Genetic Capacity for Lean Tissue Growth on the Amino Acid Needs of Pigs," it was noted that carcass leanness was improved as dietary lysine levels were raised in connection with pigs in the 40 to 240 pound range and that pigs with high lean growth potential had much higher growth performance and lean gain when the nutrient density of the diet was increased. These results indicated that some improvement in lean growth, through dietary manipulation, should be possible with all genotypes.

SUMMARY OF THE INVENTION

It has now been discovered that the feeding of early weaned pigs (often called "starter pigs"), in a timely manner, with a combination of L-carnitine and a high nutrient-density diet (HNDD) not only increases average weight gain and feed efficiency, but also unexpectedly increases the lean tissue growth in such animals. This result is particularly surprising because starter pigs are in a period of rapid growth where there is very little fat. (This is in contrast to finishing pigs, where there is a much higher ratio of fat to lean.) Most strikingly, this increase in lean tissue is maintained through the later stages of growth of the pig. It is speculated that at this stage of the animal,s development and with the HNDD, the L-carnitine actually partitions the nutrients so as to favor lean accretion, despite the already lean state of the animal, while at the same time allowing sufficient fat to form as is necessary for normal growth.

To be effective, it is necessary that the feed regimen be commenced at a time when the endogenous carnitine synthesis is very low, i.e., preferably in the period when the pig is less than about 24 days of age and when the pig is growing at or near its true genetic potential. The response to the carnitine-supplemented HNDD will, of course, be more pronounced for genotypes having high lean growth capacities.

DETAILED DESCRIPTION OF THE INVENTION

In the practice of the invention, starter pigs from birth up to 24 days of age having an initial weight of from 3 to 16 pounds are fed the diet of the invention in at least two, preferably in three, phases. The Phase 1 diet is for a period of from one to three weeks, preferably two weeks or until the body weight is about 15 pounds, and contains from about 5 to 5000 ppm of L-carnitine, preferably about 500 to 2000 ppm, optimally about 1000 ppm.

In Phase 2, commenced when the pig is about 35 days old, the diet is administered from two to four weeks after Phase 1, preferably for three additional weeks. The L-carnitine is optimally reduced to 500 ppm, but amounts between 250 and 1000 ppm are also effective.

Even after Phase 2, the addition of L-carnitine as a feed supplement may be advantageous in both the grower stage (i.e., up to a weight of 160 pounds; approximately 130 days of age) and the finishing stage. During the grower stage (56 to 160 lb.), the amount of carnitine would be gradually reduced from 500 to 5 ppm. The maximum during finishing is 50 ppm, desirably from 5 to 50 ppm. Generally as the weight of the animal increases, the optimum amount of carnitine decreases.

As mentioned previously, early weaning often refers to weaning at 3 weeks of age or less. In modern nursery facilities, pigs are often weaned at 21 days of age onto an inferior diet, with pigs losing weight the first week postweaning. In fact, weaning at 3 weeks of age in commercial operations commonly results in nursery pigs ranging in age from 14 to 28 days. Obviously, early weaning results in several lightweight pigs (<10 lb.) that require increased nutrient density and diet palatability to maintain growth on a dry diet. To provide optimum nutritional management for the early weaned pig, a three-phase starter program during the nursery phase of swine production was developed at Kansas State University. Listed below is a description of this starter program, with the suggested feeding interval for each phase.

| | Three-Phase Starter Program | |
|---|---|---|
| Item | Description | Recommendation |
| Phase 1 | High Nutrient-Density Diet | Fed to pigs until body weight is at least 15 lb. |
| Phase 2 | 1.25% lysine, whey, corn-soybean diet | Fed to pigs from 15 to 25 lb. |
| Phase 3 | 1.10% lysine, grain-soybean diet | Fed to pigs until body weight is approx. 50 lb. |

Starter diets for pigs weaned at 14 to 21 days of age have been the topic of considerable speculation because of the variation in results. Swine producers have grown accustomed to seeing early-weaned pigs experience a postweaning "check", which often results in increased days to market in their production unit. In fact, many producers have replaced 21-day weaning with a 28-day weaning program, simply because of the adverse performance of pigs during the initial week in the nursery. A high nutrient-density diet (HNDD) is a type of milk-based diet that is intended to improve the initial starter pi9 performance. Various formulations of HNDD have been tried in commercial swine production units with variable success.

There are actually two types of HNDD that have been formulated for early-weaned pigs. The first approach has been to formulate diets to be as similar to sow,s milk as possible, but in a dry form. Diets based on total milk protein with added vitamins and minerals are very successful, yet prohibitively expensive. In a similar category is a HNDD formulated with an understanding of the digestive capacity of the young pig, but with some awareness for economic constraints. Such HNDD diets, useful in the practice of the subject invention, are described in the following Table:

TABLE

| Characteristics of a Three-Phase Starter Program | | | |
|---|---|---|---|
| Item | Phase 1 HNDD | Phase 2 Whey Start | Phase 3 To 50 lb. Body Weight |
| Protein, % | 20-25 | 18-20 | 18 |
| Lysine, % | 1.5-1.6 | 1.25 | 1.10 |
| Added Fat, % | 8-10 | 3-5 | — |
| Dried Edible Whey, % | 15-25 | 15-20 | 0-5 |
| Dried Skim Milk, % | 10-25 | — | — |
| Fish Meal, % | 0-3 | 3-5 | — |
| Copper, ppm | 190-260 | 190-260 | 190-260 |
| Vitamin E, IU/ton | 40,000 | 40,000 | 40,000 |
| Selenium, ppm | .3 | .3 | .3 |
| Antibacterial or Antibiotic | + | + | + |
| Physical Form | ¼" Pellet | ¼" Pellet | Meal Form |

As a general matter, the Phase 1 diets (which are supplemented with carnitine in accordance with the practice of the instant invention) contain at least 15%, preferably from 18 to 30%, protein; from 30 to 45% dried milk products such as light edible whey, dried skim milk, and casein; and from 5 to 15% added fat.

In Phase 2, the protein is decreased to less than 25%, preferably from 15 to 25%; the dried milk products to less than 25%, preferably from 10 to 25%; and the added fat to from about 1 to 5%.

In Phase 3, the diet maintains about the same percentage of protein as in Phase 2, the dried milk products are reduced to less than 10%, and the added fat substantially eliminated.

While the term "milk products" is used in the above description, it should be understood that this term is intended to include nutritional products which are derived from other sources and have compositions substantially similar to those derived from milk. These include soy protein concentrates made by extracting soy flour with ethanol to reduce the carbohydrate content, soy isolates which further concentrate the protein by acid extracting soy flour with acid, and plasma protein which is obtained by the spray drying of porcine or bovine plasma. The essential factor is to obtain a protein source that has a solids content similar to that in the mother's milk, i.e., that is highly digestible protein, very low in carbohydrates with little antigenicity.

It will be understood that other ingredients are conventionally added to the diet, as shown in the above table. The lysine percentages must be carefully controlled, the amounts used approximating those shown in the above table. Additional ingredients such as fish meal, trace minerals including copper and selenium, vitamins, antibacterials and antibiotics are also added, as is well known to those skilled in the art.

Conventionally, the diet is fed on an ad libitum basis in the form of pellets or ground to form a meal, depending on the age of the pig. The appropriate form of the feed is well known to those skilled in the art, as are the feeding regimens, that is, the frequency and amount of diet fed to the animals. Those skilled in the art may readily determine the amount of total feed at the various stages of pig development.

The following table provides the general ranges applicable to the various stages.

TABLE

| Daily Intake (grams) | Phase 1 | Phase 2 | Phase 3 |
|---|---|---|---|
| Broadly | 150-700 | 400-900 | 600-1500 |
| Preferred | 300-500 | 500-800 | 800-1200 |

Most advantageously, the intake of the diet of the invention should average greater than 345 grams per day for the first two weeks, and average greater than 725 grams per day for the following three weeks. An average over 600 grams per day over the five weeks is also effective.

To demonstrate the efficacy of the instant invention attention is directed to the following example:

EXAMPLE

One hundred eighty weanling pigs (22±2 days of age, initial weight 6 kg) were used to show the effect of feeding nursery pigs L-carnitine on pig performance and carcass composition. The experimental arrangement with 0 or 1000 ppm L-carnitine fed in Phase 1 (0 to 2 weeks) combined with 0, 250 or 500 ppm L-carnitine in Phase 2 (3 to 5 weeks). Phase 1 diets contained 20% dried skim milk, 20% dried whey, 5% soybean oil and were formulated to contain 1.45% lysine. Phase 2 diets contained 10% dried whey, 5% soybean oil and were formulated to contain 1.25% lysine. Six pigs at 0 and 1000 ppm carnitine level on day 14 and six pigs at 0 and 500 ppm carnitine level on day 35 (24 total) were sacrificed and ground to determine carcass composition. In Phase 1, L-carnitine increased (P<0.02) feed intake (FI) and improved (P<0.08) average daily gain (ADG), but had no effect on feed/gain (F/G). In Phase 2, and for the cumulative 5 week trial, increasing dietary L-carnitine improved (linear, P<0.06) F/G and decreased (linear, P<0.05) FI; however, ADG was not influenced. Carcass dry matter (DM) and crude protein (CP) were not influenced (P<0.15) by dietary L-carnitine on day 14 or 25. Percent carcass lipid was not affected by dietary treatment on day 14; however, pigs fed 1000 ppm L-carnitine in Phase 1 had less (P<0.05) daily fat accretion (DFA) on day 35 regardless of whether they were fed carnitine in Phase 2 or not. Based on the results of this experiment, L-carnitine addition reduces carcass fat when fed in Phase 1 and improves F/G when fed in Phase 2.

TABLE

| P1/P2[a] | ADG, g 0-2 wk | F/G 0-2 wk[b] | ADG, g 3-5 wk | F/G 3-5 wk[cd] | ADG, g 0-5 wk | F/G 0-5 wk[c] | DM, % d 35 | CP, % d 35 | DFA, g d 35[e] |
|---|---|---|---|---|---|---|---|---|---|
| 0/0 | 281 | 1.24 | 485 | 1.96 | 404 | 1.68 | 36.7 | 17.9 | 68.9 |
| 0/250 | 286 | 1.30 | 431 | 1.88 | 399 | 1.54 | — | — | — |
| 0/500 | 281 | 1.13 | 485 | 1.70 | 399 | 1.54 | 36.8 | 18.1 | 62.2 |
| 1000/0 | 318 | 1.17 | 480 | 1.92 | 417 | 1.66 | 35.4 | 18.3 | 39.1 |
| 1000/250 | 331 | 1.13 | 454 | 2.19 | 408 | 1.72 | — | — | — |
| 1000/500 | 286 | 1.19 | 454 | 1.78 | 386 | 1.59 | 36.4 | 17.5 | 47.1 |

[a]Phase 1/Phase 2 carnitine levels, ppm
[b]Carnitine effect (P < .08)
[c]Linear carnitine effect (P < .06)
[d]Quadratic carnitine effect (P < .02)
[e]Carnitine effect (P < .05)

What is claimed is:

1. A feed composition for starter pigs weighing up to 16 pounds and as young as fourteen days which comprises at least 5 ppm of L-carnitine in admixture with a high nutrient density diet containing at least 30% milk products suitable for feeding to starter pigs, between 5 to 15% added fat, and at least 15% protein.

2. The composition of claim 1 wherein from 5 to 5000 ppm of L-carnitine are present.

3. The composition of claim 2 wherein from 250 to 2000 ppm of L-carnitine are present.

4. A method of increasing the lean-to-fat ratio of swine which comprises feeding to a starter pig weighing up to 16 pounds and between 14 and approximately 24 days in age a high nutrient density diet containing at least 5 ppm of L-carbitine, at least 30% of milk products suitable for feeding to starter pigs, between 5 to 15% added fatm and at least 15% protein.

5. The method of claim 4 wherein the carnitine is fed to the swine is in an amount which is decreased as the weight of the pig increases.

6. The method of claim 4 wherein the swine in the nursery stage is an early weaned pig not more than 24 days old and the diet is commenced immediately upon weaning.

7. The method of claim 4 wherein the swine is fed from 150 to 700 grams of the diet per day.

8. The method of claim 4 wherein the swine is fed on an ad libitum basis.

9. A method of increasing the lean-to-fat ratio of a pig which comprises feeding to an early weaned pig, for a period of at least five weeks, a diet supplement with at least 5 ppm of L-carnitine wherein the diet is suitable for administration to a pig weighing up to 16 pounds and as young as 14 days, containing at least 30% milk products, between 5 to 15% added fat and at least 15% protein.

10. The method of claim 9 wherein the carnitine level fed to said early weaned pig during the first two weeks is from 50 to 2000 ppm and during the next three weeks is reduced to from 25 to 1000 ppm.

11. A method of increasing the lean-to-fat ratio of a swine using a three-stage feeding regimen which comprises feeding to the swine:

in the first stage, a high nutrient density diet containing at least 5 ppm of L-carnitine, at least 30% of milk products suitable for administration to starter pigs, between 5 and 15% added fat, and at least 15% protein, and an effective amount of lysine, until said swine reaches a weight of 16 pounds;

in the second stage, a diet containing between 250 to 1000 ppm of L-carnitine, between 15 to 25% protein, and between 10 to 25% dried milk products, until said swine achieves a weight of approximaqtely 25 pounds; and, in the third stage, a diet containing between 5 to 500 ppm L-carnitine, between 15 to 25% protein, less than 10% milk products, and about 1.1% lysine, until said swine reaches a body weight of approximately 50 pounds.

12. The method of claim 11 wherein the swine is fed from 150 to 700 grams of the diet per day until it reaches 15 pounds, from 400 to 900 grams per day while it is between 15 and 25 pounds, and from 600 to 1500 grams per day while it is between 25 and 60 pounds.

* * * * *